(12) United States Patent
Bielski

(10) Patent No.: US 8,090,871 B2
(45) Date of Patent: Jan. 3, 2012

(54) DETERMINING A REMOTE MANAGEMENT PROCESSOR'S IP ADDRESS

(75) Inventor: Julianne Bielski, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1363 days.

(21) Appl. No.: 10/689,432

(22) Filed: Oct. 20, 2003

(65) Prior Publication Data

US 2005/0086375 A1    Apr. 21, 2005

(51) Int. Cl.
*G06F 15/16* (2006.01)
(52) U.S. Cl. ....................................................... 709/245
(58) Field of Classification Search .................. 709/220, 709/223, 245
See application file for complete search history.

(56) References Cited

U.S. PATENT DOCUMENTS

| | | | |
|---|---|---|---|
| 5,287,537 A | 2/1994 | Newmark et al. | |
| 5,426,775 A * | 6/1995 | Boccon-Gibod | 714/36 |
| 5,671,412 A | 9/1997 | Christiano | |
| 5,745,879 A | 4/1998 | Wyman | |
| 5,873,067 A | 2/1999 | Kobayashi | |
| 5,964,891 A | 10/1999 | Caswell et al. | |
| 6,012,100 A | 1/2000 | Frailong et al. | |
| 6,067,569 A * | 5/2000 | Khaki et al. | 709/224 |
| 6,353,854 B1 | 3/2002 | Cromer et al. | |
| 6,367,074 B1 * | 4/2002 | Bates et al. | 711/170 |
| 7,318,089 B1 * | 1/2008 | Stachura et al. | 709/223 |
| 2002/0052876 A1 * | 5/2002 | Waters | 707/100 |
| 2003/0018763 A1 * | 1/2003 | Doherty et al. | 709/223 |
| 2003/0051170 A1 * | 3/2003 | Spearman | 713/201 |
| 2003/0120811 A1 * | 6/2003 | Hanson et al. | 709/245 |
| 2003/0145073 A1 | 7/2003 | Lee | |
| 2003/0163584 A1 * | 8/2003 | Anderson et al. | 709/245 |
| 2003/0212781 A1 * | 11/2003 | Kaneda et al. | 709/223 |
| 2004/0073706 A1 * | 4/2004 | Eguchi et al. | 709/245 |
| 2005/0097182 A1 * | 5/2005 | Bishop et al. | 709/209 |
| 2006/0165056 A1 * | 7/2006 | Komaki | 370/352 |

FOREIGN PATENT DOCUMENTS

CN    1435974 A    8/2003

* cited by examiner

*Primary Examiner* — Glenton B Burgess
*Assistant Examiner* — Jason Recek
(74) *Attorney, Agent, or Firm* — Cynthia G. Seal; Law Office of Jim Boice

(57) ABSTRACT

A method and system for providing an address of a remote management processor to a management server. When setting up a Dynamic Host Configuration Protocol (DHCP) server, an administrator configures a private Option in the DHCP server. The Option data contains the IP address of the management server designated to use the remote management processor. When the remote management processor powers up, it sends a request for an IP address to the DHCP server, which returns both the requested IP address as well as the Option data. Firmware in the management processor is capable of reading and interpreting the Option data, and sends the management server, plus any other configured destinations, the IP address of the remote management processor in an Alert packet The management server is thus notified that the remote management processor is on-line and available to manage the remote hardware server for the management server.

14 Claims, 5 Drawing Sheets

DETERMINING A REMOTE MANAGEMENT PROCESSOR'S IP ADDRESS

BACKGROUND

The present invention relates in general to the field of computers, and in particular to servers using management processors. Still more particularly, the present invention relates to a method and system for a remote management processor to automatically provide its own Internet Protocol (IP) address to the management server assigned to manage it when the remote management processor receives its IP address from a DHCP server.

Current generation servers are often modular in their architecture. This modularity extends not only to the internal structure of the server, but also to appropriated resources of the server. A person responsible for administering the server may wish to use a management server (i.e. a computer running a management server software package) to access information about the server's hardware resources. They may also purchase a management processor for the server that allows them to communicate with the server even when the server's operating system is not present. In order to access the server when its operating system is not present, the management server must be able to communicate with the remote hardware server via its management processor's network interface.

Such a modular system is illustrated in FIG. 1. A management server 102 is designed to communicate via a network 104 with a remote management processor 106, which provides a communication interface to a remote hardware server 116. The communication between management server 102 and remote management processor 106 is typically via respective network interface cards (NICs) 110a and b, which are usually Ethernet cards. Remote hardware server 116 communicates information about hardware resources 114 controlled by its local operating system via a system NIC 110c. These resources may be memory, logic, and other hardware.

As the dotted line between NIC 110a-1 and NIC 110b suggests, management server 102 cannot communicate with remote management processor 106 unless management server 102 knows the IP address of remote management processor 106.

Remote management processor 106 can obtain an IP address from a Dynamic Host Configuration Protocol (DHCP) server 108, which is typically part of a network of DHCP servers. To obtain an IP address, remote management processor 106 follows well-established DHCP protocol. As described in FIG. 2, this protocol begins with a DHCP client, here being remote management processor 106, broadcasting a DHCP DISCOVER request to a network of DHCP servers 112. This DHCP DISCOVER packet asks any authorized DHCP Server receiving the DHCP DISCOVER packet for information about leasing an IP address. One or more DHCP servers in DHCP server network 112 respond with DHCP OFFER messages back to the remote management processor 106. The DHCP OFFER messages contain the IP addresses of the responding DHCP servers, plus a Dynamic IP address with lease information about the IP addresses being offered (typically as defined by the Internet Engineering Task Force Request For Comments 1534, 2131, and 2132).

The remote management processor 106 then decides which DHCP OFFER to accept, based on some pre-determined criteria, such as which DHCP OFFER was received first, which lease is most attractive to the needs of the remote sub-system processor 106, etc. The remote management processor 106 then returns a DHCP REQUEST message to the selected DHCP server 108 that sent the chosen DHCP OFFER. This DHCP Server 108 then returns a DHCP ACK message, which includes an IP address for the remote management processor 106, plus lease and configuration information related to that IP address assignment.

A serious problem with the procedure described in FIGS. 1 and 2 is that the management server 102 does not have an easy way of knowing when the remote management processor 106 comes on line, or what the IP address for the remote management processor 106 is. The remote management processor 106 is "unmanageable" as is remote hardware server 116 until the management server 102 being used by the administrator is given this information somehow. In other words, the administrator using management server 102 likely knows that he has bought or leased services from the remote management processor 106, but he doesn't know how to access these services without first knowing the IP address of the remote management processor 106. Therefore, an engineer or technician must go to the physical location of the remote management processor 106, configure it with an IP address as described in FIG. 2, and then call the system administrator on the phone telling that administrator that the remote management processor 106 is on line and what IP address is assigned to the remote management processor 106.

What is needed, therefore, is a method and system that automatically informs the management server what the IP address of the remote management processor coming on line is. Preferably, such a method and system would not require additional hardware, nor would it require additional software in the management server or the DHCP server.

SUMMARY

In one embodiment, a method and/or computer program product provides an internet protocol (IP) address of at least one remote management processor to a management server. An IP address issuing computer is configured to include a plurality of IP addresses that are available and authorized to be assigned to at least one remote management processor, which is coupled to a remote hardware server. The IP address issuing computer contains Option data associated with each remote management processor. The Option data includes an IP address of the management server that is able to access information about hardware resources disposed within the remote hardware server. A request is sent, from the remote management processor to the IP address issuing computer, for an IP address to be assigned to the remote management processor. In response to this request, the remote management processor receives an acknowledgement packet from the IP issuing computer. This acknowledgment packet includes the requested IP address assigned to the remote management processor and the Option data. Local code in the remote management processor searches the Option data for an IP address of the management server. An alert packet, which includes the requested IP address for the remote management processor and that IP address' shelf life, is automatically sent to the management server.

In one embodiment, a system provides an interne protocol (IP) address of at least one remote management processor to a management server. The system comprises: a management server, at least one remote management processor, and an IP address issuing computer. The remote management processor is coupled to the management server through a network, and is also coupled to a remote hardware server. The management server is configured to communicate via the network with the remote management processor to access information about hardware resources disposed within the remote hardware server. The IP address issuing computer is also connected to the remote management processor through the network. The IP address issuing computer includes a plurality of IP addresses that are available and authorized to be assigned to the remote management processor. The IP address issuing computer also includes Option data that is associated with the remote management processor. This Option data includes an IP address of the management server. The remote management processor sends a request to the IP address issuing computer for an IP address to be assigned to the remote management processor. In response to receiving the request from the remote management processor, the IP address issuing computer assigns an IP address to the remote management processor and sends an acknowledgment packet to the remote management processor. This acknowledgement packet includes the assigned IP address and the Option data. Local code in the remote management processor searches the Option data for the IP address of the management server, which is used as a destination address for sending an alert packet, which includes the IP address of the remote management processor and its shelf life. This alert packet is automatically sent from the remote management processor to the management server in order to enable network communication between the management server and the remote management processor.

BRIEF DESCRIPTION OF THE SEVERAL VIEWS OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION

Figure 1:
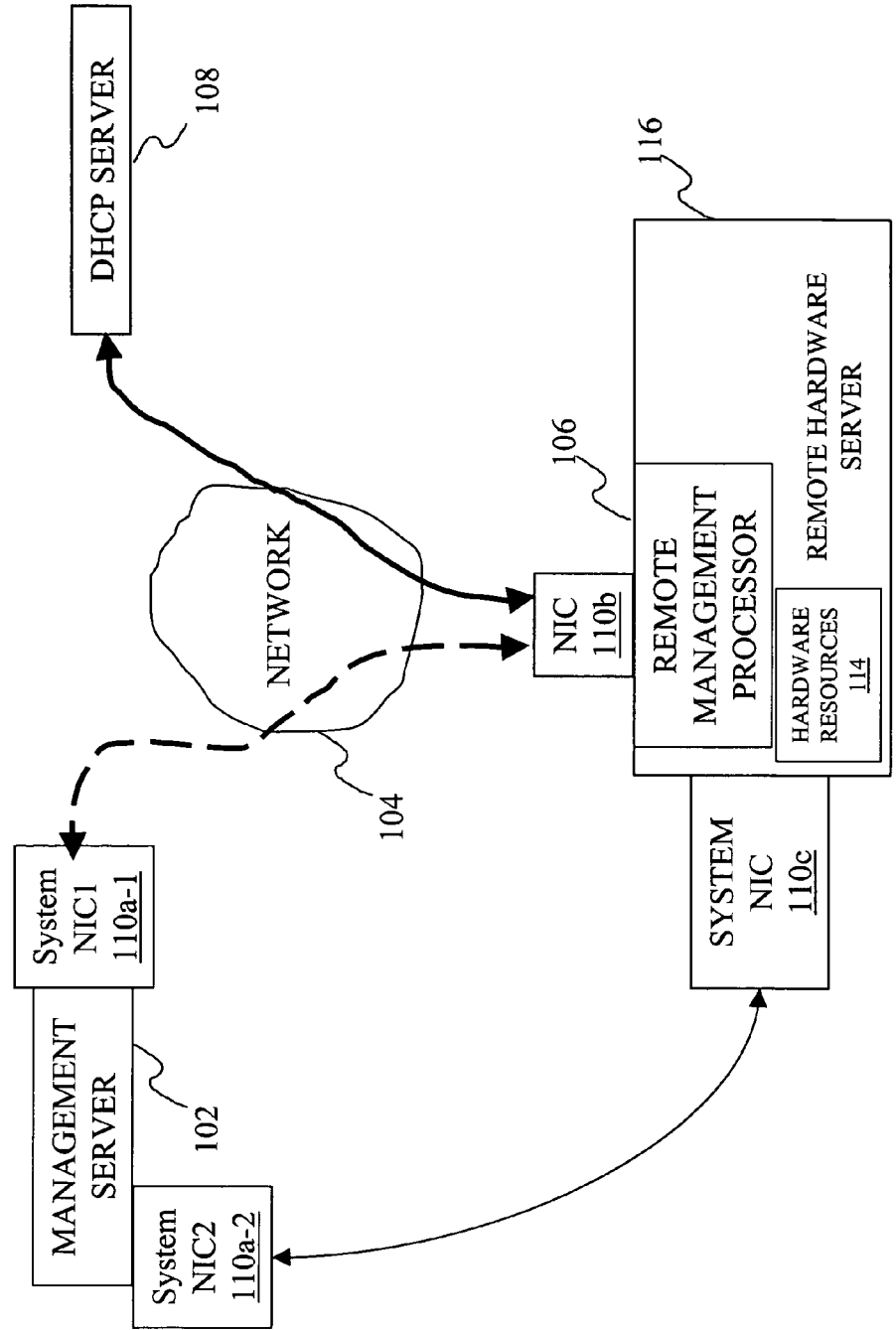
FIG. 1 depicts a prior art diagram of a network connecting a remote sub-system processor to a management server and a Dynamic Host Configuration Protocol (DHCP) Server.
Figure 2:
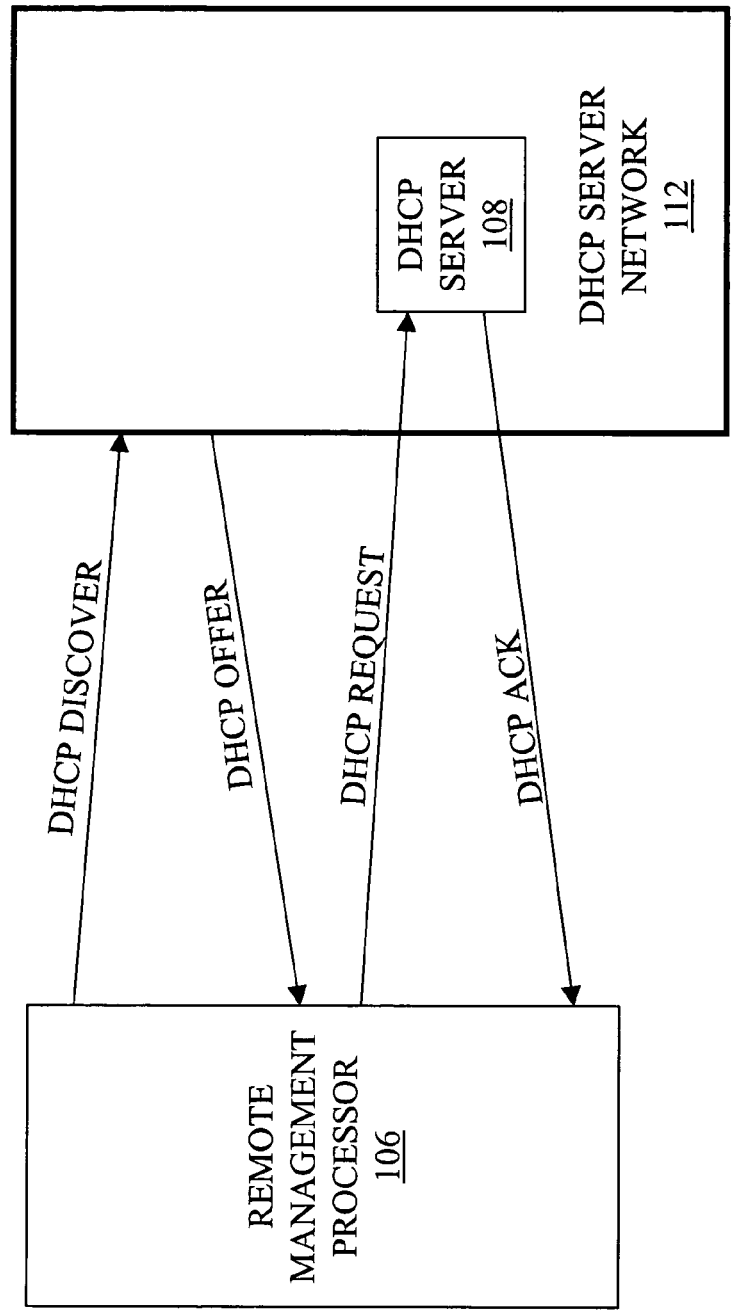
FIG. 2 illustrates a prior art method for the remote management processor to obtain an Internet Protocol (IP) address from the DHCP Server.
Figure 3:
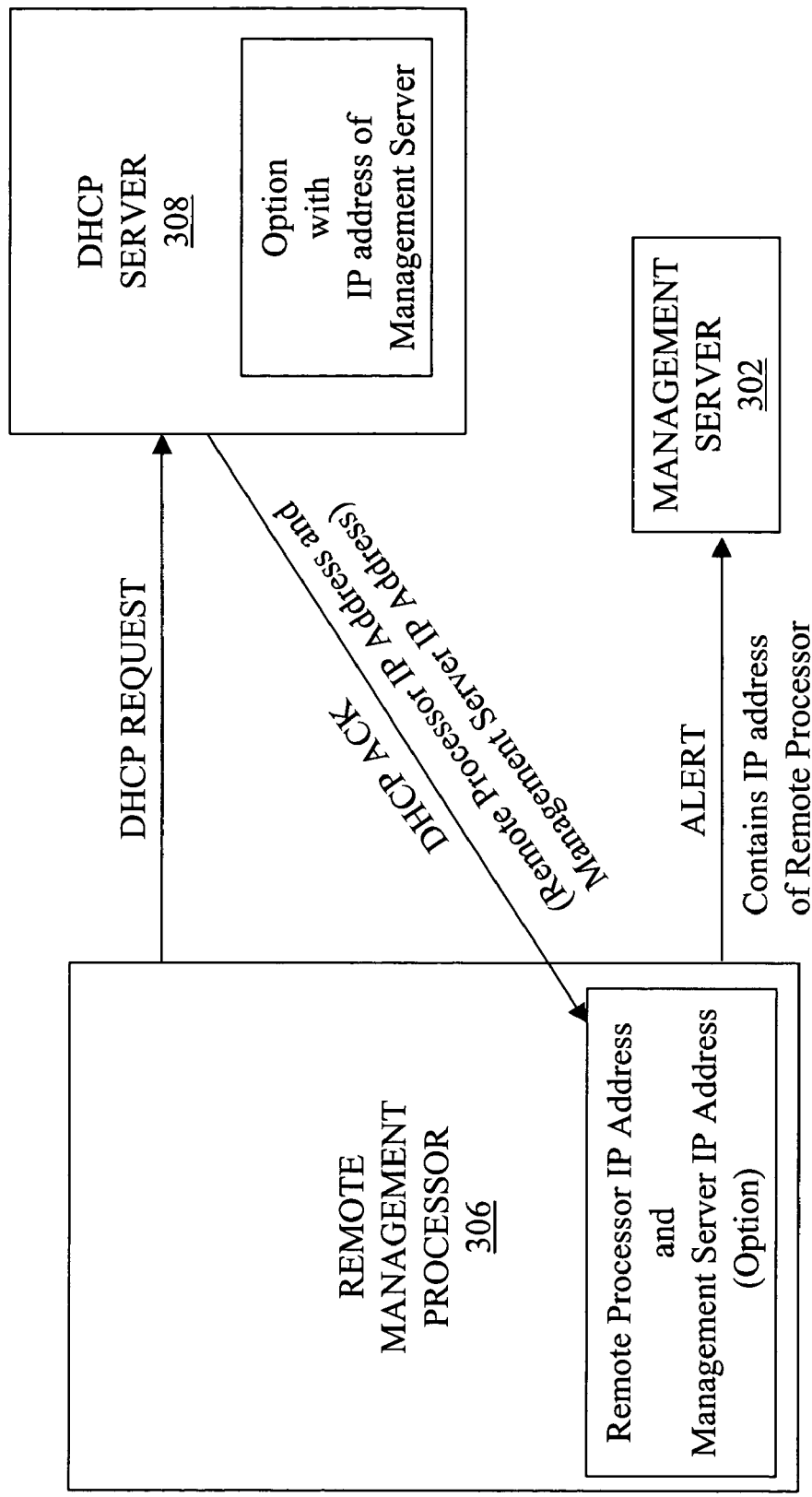
FIG. 3 depicts a block diagram of the present invention system enabling the remote management processor to convey to the management server a newly acquired IP address for the remote management processor.

With reference now to FIG. 3, there is depicted a block diagram of a preferred embodiment of the present invention. A remote management processor 306 sends a DHCP REQUEST to a DHCP Server 308. The DHCP Server 308 is configured with a private option by the administrator of the management server 302 that is designated to manage the remote management processor 306. The option is set to the IP address of the management server 302. Thus, the DHCP ACK packet from DHCP Server 308 includes both the IP address being assigned to remote sub-system processor 306 as well as special Option data, which includes the IP address of management server 302. Both IP addresses are stored in remote management processor 306.

When the remote management processor 306 receives the DHCP ACK packet, special code in the remote management processor 306 searches the DHCP ACK packet for the special Option data, which includes the IP address of management server 302. Remote management processor 306 stores the Option data as an alert destination. Responsive to detecting the Option data, the remote management processor 306 then sends its IP address to management server 302 in an ALERT packet. Management server 302 receives the ALERT packet, and stores the information about the IP address assigned to remote management processor 306. This information includes the IP address itself, as well as the shelf life of the address and any special restrictions or features associated with the IP address.

Figure 4:
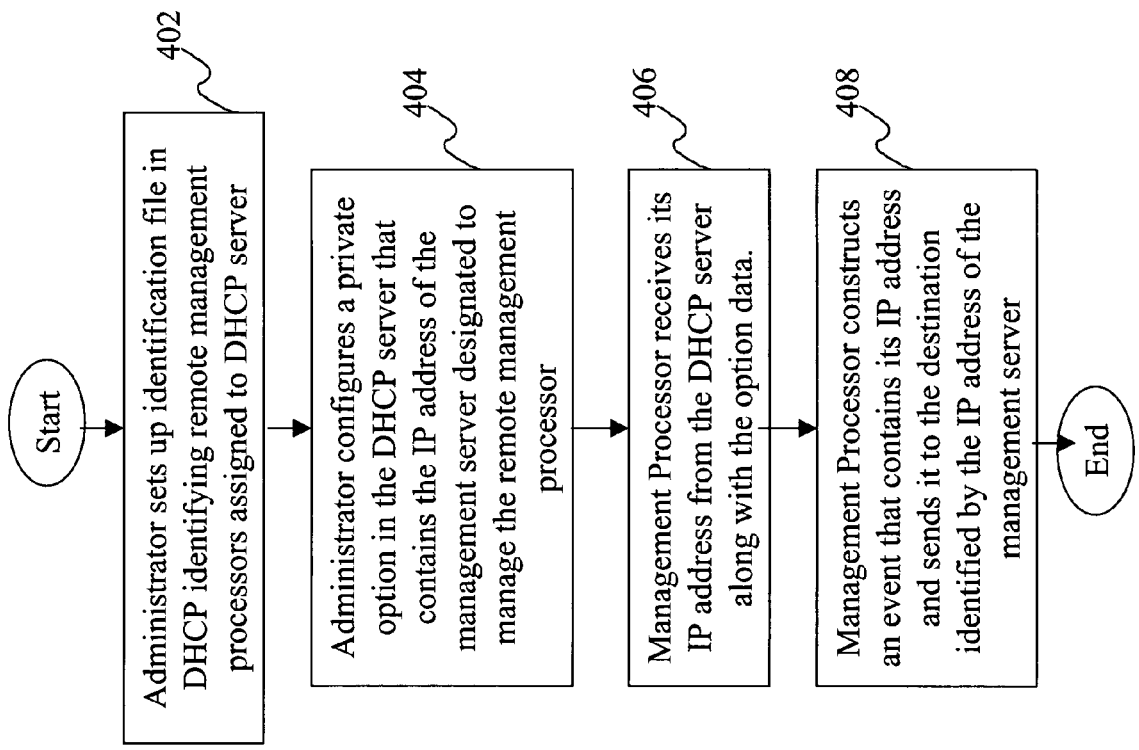
FIG. 4 is a flow chart describing an initial configuration of the DHCP Server.

With reference now to FIG. 4, there is depicted a flow-chart describing the set-up of DHCP Server 308 described in FIG. 3. Starting at block 402, the administrator of the management server begins the setup of the DHCP Server by identifying in a Configuration File what IP addresses the DHCP Server is authorized to assign.

With reference now to block 404, the administrator of the management server continues configuring the DHCP server by defining Option data, which includes the IP address of the management server. As described above, the remote management processor has special code that looks for the Option data in the DHCP ACK packet. When the Option data containing the IP address of the management server is detected (block 406), the remote sub-system processor then sends an ALERT message to the management server (block 408), alerting the management server to the fact that the remote management processor now has an IP address and what that IP address is, thus enabling the management server in utilizing the function of the remote management processor. This function may or may not require the use of an operating system, thus making the management processor's function available as soon as an IP address is assigned.

Figure 5:
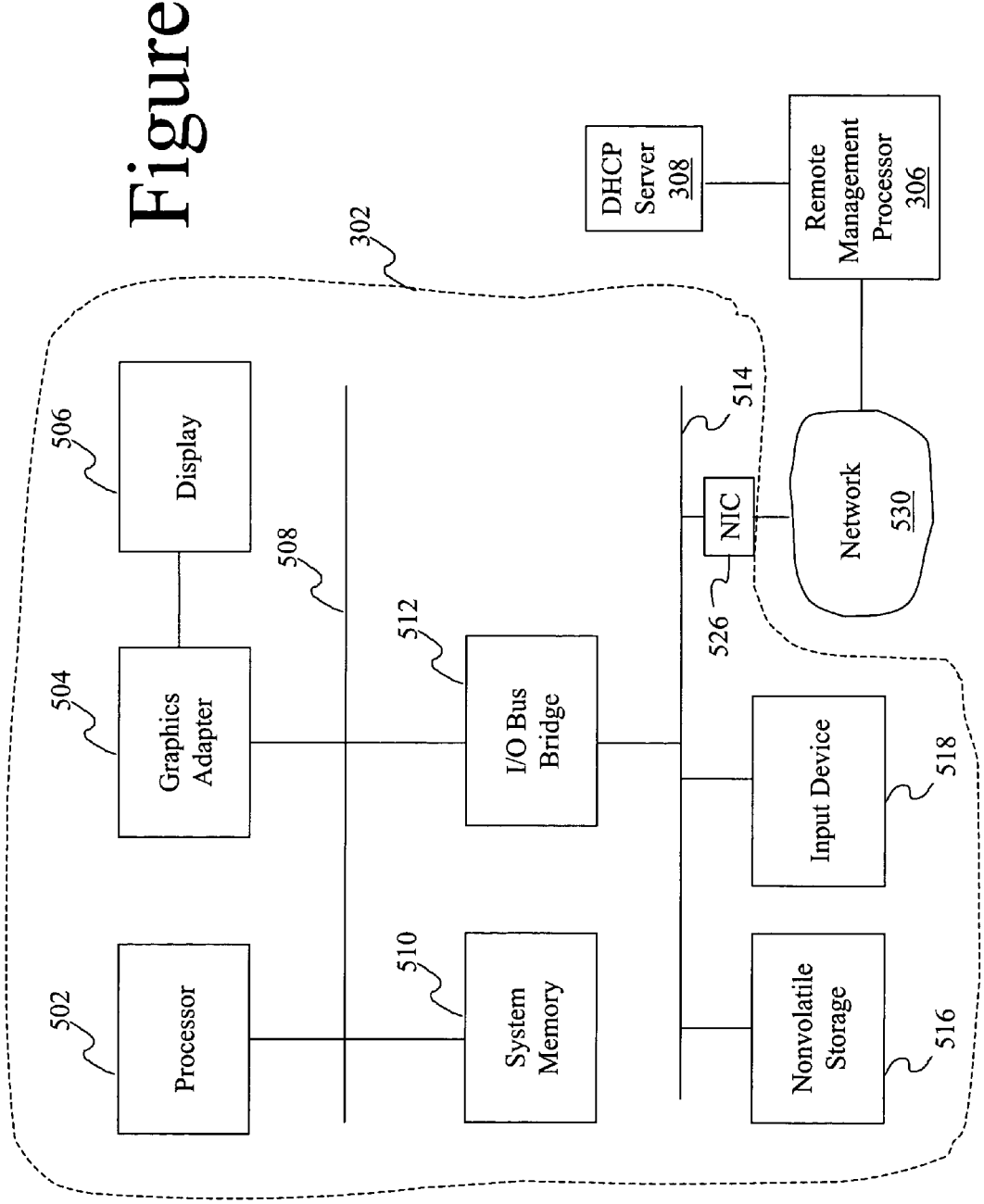
FIG. 5 illustrates preferred components of the management server, DHCP server and remote management processor.

With reference now to FIG. 5, there is depicted a block diagram of a preferred embodiment of management server 302. Management server 302 includes a processor 502, which is connected to a system bus 508. In the exemplary embodiment, management server 302 includes a graphics adapter 504 also connected to system bus 508, receiving information for display 506.

Also connected to system bus 508 are system memory 510 and input/output (I/O) bus bridge 512. I/O bus bridge 512 couples I/O bus 514 to system bus 508, relaying and/or transforming data transactions from one bus to the other. Peripheral devices such as nonvolatile storage 516, which may be a hard disk drive, floppy drive, a compact disk read-only memory (CD-ROM), a digital video disk (DVD) drive, or the like, and input device 518, which may include a conventional mouse, a trackball, or the like, is connected to I/O bus 514. Client computer 500 connects with network 520 via a network interface card (NIC) 526 as shown.

Network 520 may be the Internet, an enterprise confined intranet, an extranet, or any other network system known to those skilled in the art of computers.

The exemplary embodiment shown in FIG. 5 is provided solely for the purposes of explaining the invention and those skilled in the art will recognize that numerous variations are possible, both in form and function. For instance, data processing system 500 might also include a sound card and audio speakers, and numerous other optional components. All such variations are believed to be within the spirit and scope of the present invention.

Connected to network 530 is remote management processor 306, which in a preferred embodiment has a same or similar architecture as described for management server 302 in detail in FIG. 5. Connected to remote management processor 306 is DHCP server 308, which also has a same or similar architecture as described for management server 302

The present invention therefore provides a method and service allowing an administrator of a management server to configure a DHCP Server in such a way that when the DHCP Server assigns an IP address to the remote management processor, the management server is automatically so notified by the remote management processor. This allows the management server to know where all of the remote management processors are, and how to communicate with them, thus making the addition of remote resources seamless and automatic.

It should be understood that at least some aspects of the present invention may alternatively be implemented in a program product. Programs defining functions on the present invention can be delivered to a data storage system or a computer system via a variety of signal-bearing media, which include, without limitation, non-writable storage media (e.g., CD-ROM), writable storage media (e.g., a floppy diskette, hard disk drive, read/write CD ROM, optical media), and communication media, such as computer and telephone networks including Ethernet. It should be understood, therefore in such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

While the invention has been particularly shown and described with reference to a preferred embodiment, it will be understood by those skilled in the art that various changes in form and detail may be made therein without departing from the spirit and scope of the invention.

What is claimed is:

1. A method for providing an internet protocol (IP) address of at least one remote management processor to a management server, the method comprising:
    configuring an IP address issuing computer to include a plurality of IP addresses that are available and authorized to be assigned to at least one remote management processor which is coupled to a remote hardware server to perform management functions thereon, and to include Option data associated with the at least one remote management processor, such that the Option data comprises an IP address of the management server which is configured to communicate via a network with the at least one remote management processor to access information about hardware resources disposed within the remote hardware server coupled to the at least one remote management processor;
    sending a request from the at least one remote management processor to the address issuing computer for an IP address to be assigned to the at least one remote management processor;
    in response to the request, receiving from the IP issuing computer, at the at least one remote management processor, an acknowledgement packet which includes the requested IP address assigned to the at least one remote management processor and the Option data;
    in response to receiving the acknowledgment packet, executing a local code in the at least one remote management processor such that the local code searches the acknowledgement packet to detect the Option data, and storing in the remote management processor, as a destination address for sending an alert packet, the received IP address of the management server included in the Option data; and
    in response to the detecting of the Option data, automatically sending the alert packet to the destination address by the at least one remote management processor, such that the alert packet comprises the received requested IP address of the at least one remote management processor, and wherein the alert packet further comprises a shelf life of the received requested IP address.

2. The method of claim 1, further comprising:
    in response to receiving the alert packet at the destination address, the management server stores in included in the alert packet, which information includes the fP address assigned to the at least one remote management processor and a shelf life of the assigned IP address.

3. The method of claim 2, wherein the IP address issuing computer is a Dynamic Host Configuration Protocol (DHCP) server, wherein a configuration file in the DHCP server identifies the plurality of IP addresses that are available and authorized to be assigned to the at least one remote management processor; and wherein the management server is running a management server software package to manage the at least one remote management processor.

4. The method of claim 3, wherein the sending of the request from the at least one remote management processor to the IP address issuing computer for an address for the at least one remote management processor is automatically prompted by the at least one remote management processor being powered on.

5. The method of claim 3, wherein an administrator of the management server defines the Option data configured in the IP address issuing computer.

6. The method of claim 1, wherein the alert packet is transmitted from said at least one remote processor without said at least one remote processor loading an operating system.

7. A system for providing an Internet protocol (IP) address of at least one remote management processor to a management server, the system comprising:
    a management server;
    at least one remote management processor configured to be connected to the management server through a network, wherein the at least one remote management processor is coupled to a remote hardware server to perform management functions thereon, and wherein the management server is configured to communicate via the network with the at least one remote management processor to access information about hardware resources disposed within the remote hardware server coupled to the at least one remote management processor;
    an IP address issuing computer connected to the at least one remote management processor through the network, wherein
    the IP address issuing computer is configured to include a plurality of IP addresses that are available and authorized to be assigned to the at least one remote management processor, and to include Option data which is associated with he at least one remote management processor and includes an IP address of the management server;
    the at least one remote management processor sends a request to the IP address issuing computer for an IP address to be assigned to the at least one remote management processor;
    the IP address issuing computer assigns an IP address to the at least one remote management processor in response to the request and sends an acknowledgment packet to the at least one remote management processor which includes the assigned IP address and the Option data;

the at least one remote management processor receives the acknowledgement packet;

a local code in the at least one remote management processor searches the acknowledgement packet to detect the Option data and stores in the at least one remote management processor, as a destination address for sending an alert packet, the received IP address of the management server included in the Option data, and a shelf life of the received IP address; and in response to the detecting of the Option data, automatically sending the alert packet to the destination address by the at least one remote management processor to enable the communication between the management server and the at least one remote management processor via the network.

8. The system of claim 7, further comprising:

in response to receiving the alert packet at the destination address, the management server stores information included in the alert packet, which information includes the IP address assigned to the at least one remote management processor and a shelf lite of the assigned IP address.

9. The system of claim 8, wherein the IP address issuing computer is a Dynamic Host Configuration Protocol (DHCP) server, wherein a configuration file in the DHCP server identifies the plurality of IP addresses that are available and authorized to be assigned to the at least one remote management processor; and wherein the management server is running a management server software package to manage the at least one remote management processor.

10. The system of claim 9, wherein the sending of the request from the at least one remote management processor to the IP address issuing computer for an IP address for the at least one remote management processor is prompted by the at least one remote management processor being powered on.

11. A computer program product, residing on a non-transitory computer storage medium, for providing an internet protocol (IP) address of at least one remote management processor to a management server, the computer program product including program code that when executed by a computer includes functionality comprising:

configuring an IP address issuing computer to include a plurality of IP addresses that are available and authorized to be assigned to at least one remote management processor which is coupled to a remote hardware server to perform management functions thereon, and to include Option data associated with the at least one remote management processor, such that the Option data comprises an IP address of a management server which is configured to communicate via a network with the at least one remote management processor to access infomation about hardware resources disposed within the remote hardware server coupled to the at least one remote management processor;

sending a request from the at least one remote management processor to the IP address issuing computer for an IP address to be assigned to the at least one remote management processor;

in response to the request, receiving from the IP address issuing computer, at the at least one remote management processor, an acknowledgement packet which includes the requested IP address assigned to the at least one remote management processor and the Option data;

in response to receiving the acknowledgment packet, executing a local code in the at least one remote management processor such that the local code searches the acknowledgement packet to detect the Option data, and storing in the remote management processor, as a destination address for sending an alert packet, the received IP address of the management server included in the Option data; and in response to the detecting of the Option data, automatically sending the alert packet to the destination address by the at least one remote management processor, such that the alert packet comprises the received requested IP address of the at least one remote management processor, and wherein the alert packet further comprises a shelf life of the received requested IP address.

12. The computer program product of claim 11, further comprising:

in response to receiving the alert packet at the destination address, the management server stores information included in the alert packet, which information includes the IP address assigned to the at least one remote management processor and a shelf life of the assigned IP address.

13. The computer program product of claim 12, wherein the IP address issuing computer is a Dynamic Host Configuration Protocol (DHCP) server, wherein a configuration file in the DHCP server identities the plurality of IP addresses that are available and authorized to be assigned to the at least one remote, management processor; and wherein the management server is running a management server software package to manage the at least one remote management processor.

14. The computer program product of claim 13, wherein the sending of the request, from the at least one remote management processor to the IP address issuing computer for an address for the at least one remote management processor is automatically prompted by the at least one remote management processor being powered on.

* * * * *